Oct. 2, 1951        G. A. LYON        2,569,483
WHEEL COVER
Filed Oct. 15, 1948
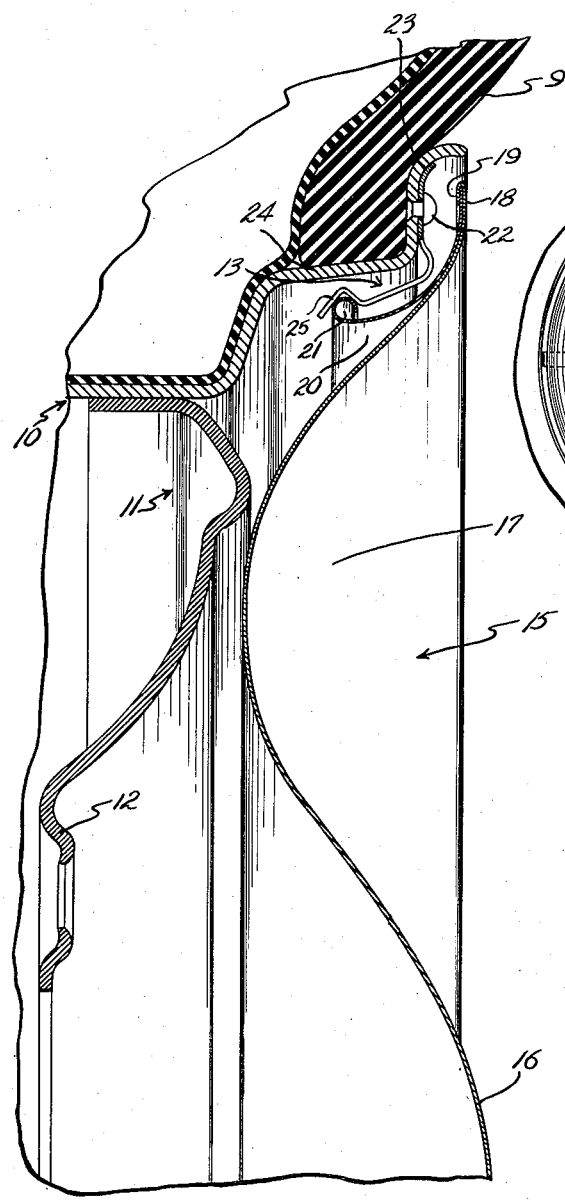
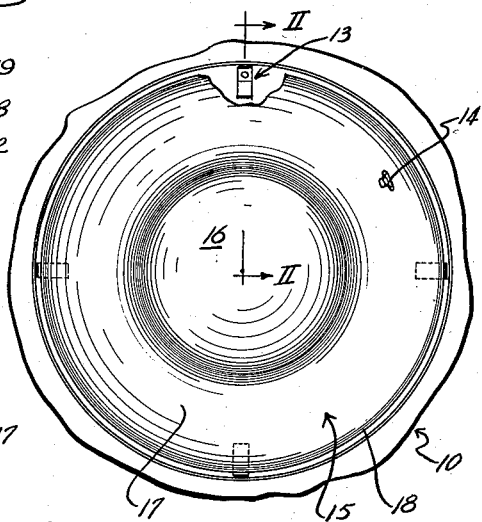
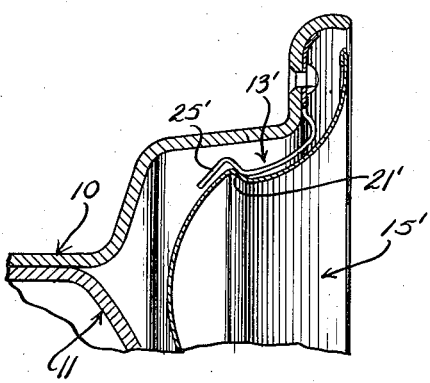
Inventor
GEORGE ALBERT LYON
by The Firm of Charles W. Hills Attys.

Patented Oct. 2, 1951

2,569,483

UNITED STATES PATENT OFFICE 2,569,483

WHEEL COVER

George Albert Lyon, Detroit, Mich.

Application October 15, 1948, Serial No. 54,700

7 Claims. (Cl. 301—37)

This invention relates to automobile wheel cover structures and more particularly to novel means for detachably retaining the cover on an outer side of an automobile wheel.

An object of this invention is to provide a wheel cover which can be floatingly and detachably supported on a wheel without any contact with the wheel except through the means for attaching the cover to the wheel.

Another object of this invention is to provide for the retention of a cover on the wheel in such manner that manufacturing variations in the relative location of the wheel parts such as the tire rim and body parts of the wheel will not affect the retention of the cover on the wheel.

Heretofore in retaining a cover on the side of a wheel, such as an automobile wheel where the cover contacts both parts of the wheel, there is a tendency for the cover or hub cap to become accidentally displaced from the wheel where there is substantial displacement of one wheel part axially relative to the other due to allowable manufacturing tolerances. In other words, if the cover has to engage two spaced points on the wheel, difficulty is encountered due to these points not being always in the same fixed relative locations. Obviously, therefore, a cover bridging the space between the points and engaging the wheel at the points may be put under considerable stress if these points are displaced axially relative to each other as a result of allowable manufacturing tolerance.

In some cases I have found that this tolerance is as much as ⅛ to ¼ of an inch.

Accordingly, I aim by this invention to provide a cover which does not have to bear on the wheel parts at all and which can be held on the wheel solely through spring clips used to detachably retain the cover on the wheel.

In accordance with the general features of this invention there is provided in a cover structure for a wheel including multi-flange tire rim and body parts a circular cover for disposition on the outer side of a wheel and spring clips attached to a flange of the rim part and extending radially inwardly behind the cover, the cover having a concealed annular shoulder positioned to be snapped into detachable cover retaining engagement with the free extremities of the spring clips and the spring clips constituting the sole engagement between the cover and the wheel so that the cover is floatingly carried on the clips.

Other objects and features of this invention will more fully appear from the following detail description taken in connection with the accompanying drawing which illustrates certain embodiments thereof and in which:

Figure 1 is a fragmentary side view of a wheel showing my cover applied thereto and with a portion of the cover broken away to show one of the spring clips;

Figure 2 is an enlarged fragmentary cross-sectional view taken on substantially the line II—II of Figure 1 looking in the direction indicated by the arrows; and Figure 3 is a fragmentary section view of a modified form of cover.

As shown on the drawings:

The reference character 9 designates generally a conventional pneumatic tire and tube assembly mounted in the usual way upon a conventional multi-flange drop center type of tire rim 10. This rim is also supported in the usual way on a body or spider part 11 having the customary central bolt-on flange 12 by means of which the wheel may be detachably bolted to a part of an axle.

Cooperable with an outer side of this wheel is a cover designated generally by the reference character 15 and embracing the features of this invention. This cover, if it is so desired, may be provided with an aperture for the usual valve stem to extend therethrough as indicated at 14 (Figure 1) so that the valve stem may be accessible from the exterior of the cover and without necessitating removal of the cover from the wheel.

In accordance with the features of this invention the cover is designed to be floatingly and detachably retained on the wheel by means of a plurality of identical spring clips designated generally by the reference character 13 and which will be more fully described hereinafter.

The cover 15 is generally of a concave dished configuration and is preferably made in the form of a metallic stamping from suitable sheet material, such for example, as steel sheet or the like. More specifically, the cover 15 includes a central crown portion 16, a concavely dished portion 17 extending into the confines of the wheel, and an outer peripheral portion 18 terminating in a turned edge 19 interlocked or lock seamed to the outer edge of an annular ring or skirt 20. The skirt 20 extends generally radially and axially inwardly from the edge 19 behind the cover, so as to be concealed thereby, and into the area defined by the stepped flanges of the tire rim 10. This skirt terminates at its radially inner extremity in an annular curled shoulder 21 adapted to be cammingly and resiliently engaged by the free extremities of the spring clips 13.

An important feature of this invention resides in the fact that the only engagement of the cover 15 with the wheel is through the contact of the shoulder 21 with the clips 13. In other words it will be perceived that the cover when it is on the wheel is in its entirety out of contact with the parts 10 and 11 and is only engaged with the wheel through the clips 13, thereby resulting in the cover being floatingly carried or suspended on the wheel.

The clips 13 may be of any suitable number such, for example, as three to five, although, as shown in Figure 1, I have in the illustrated embodiment employed four clips. Each clip is made from springy metal such as steel and has its outer portion fastened as by means of a rivet 22 to a radial side flange 23 of the rim 10. The rivets holding the clips are located so as to be concealed by the outer marginal portion 18 of the cover 15 which outer marginal portion, as shown in Figure 2, is spaced from the rim flange 23.

In addition each clip extends radially and axially inwardly behind the cover so as to terminate inside an axial flange 24 of the rim 10. The inner end of each clip is formed into a free angular extremity 25 providing a radially inwardly opening groove-like pocket of a size and configuration such as to fit around the curled edge or shoulder 21 of the cover when the cover is retained on the wheel.

The radially innermost points of the clips 13 are arranged in substantially a common circle of a diameter less than the outermost diameter of curled edge 21 so as to require radial outward deflection of the clips as the shoulder 21 engages the clips in the inward axial movement of the cover into position. In reality the angular clip extremities 25 not only resiliently engage the curled shoulder 21 but snap around the same so as to confine the shoulder against further axial movement. In this manner the cover 15 is detachably retained on the wheel in a condition so that it can float radially and yet be substantially confined against axial movement. It is clear from Figure 2 that this floating support of the cover 15 on the wheel is made possible by reason of the fact that the cover in its entirety is spaced from and out of contact with the rim and body parts of the wheel.

Removal of the cover may be easily effected by simply inserting the end of a pry-off tool under the turned and reinforced edge 19 of the cover and forcibly prying the shoulder 21 out of engagement with the free extremities of the clips 13.

In the application of the cover to the wheel the hole 14 is lined up with the valve stem and the cover is then pressed axially inwardly so that the shoulder 21 rides along the yielding clips until it snaps into the radially inwardly facing angular clip extremities 25.

In Figure 3 I have shown a modification of the invention wherein it differs from the first form in the configuration of the cover 15'. As in the first form, the wheel rim 10 carries a plurality of spring clips 13', each having a humped extremity 25' defining a groove for receiving the shoulder 21' on the cover 15'.

This shoulder 21' is formed directly in the body of the cover instead of in a rear flange or skirt 20, as in Figure 2.

An advantage of this construction resides in the fact that the shoulder 21', which extends radially outwardly, acts as a corrugation to rigidify the main body of the cover. It also serves the purpose of cooperating with the free extremities 25' of the clips 13' in such manner that the cover is floatingly carried on the wheel, out of contact with the wheel rim and body parts 10 and 11. Otherwise, this form of the invention functions and operates in substantially the same manner as the first described embodiment.

I claim as my invention:

1. In a cover structure for a wheel including multi-flange tire rim and body parts, a circular cover for disposition on the outer side of the wheel having its outer peripheral margin provided with a concealed skirt having a radially outwardly facing annular shoulder behind the cover, and cover retaining spring clips each fastened to a flange of the tire rim part and extending radially and axially inwardly to a free angular yieldable extremity providing a radially inwardly opening cover-engaging groove-like pocket, said angular extremities of the clips being disposed substantially in a common circle of a diameter less than that of said shoulder and positioned to be cammingly engaged by said cover shoulder as the cover is pressed axially into the wheel and to snap over and around said shoulder for floatingly supporting the cover on the wheel.

2. In a cover structure for a wheel including multi-flange tire rim and body parts, a circular cover for disposition on the outer side of the wheel having its outer peripheral margin provided with a concealed skirt having a radially outwardly facing annular shoulder behind the cover, and cover retaining spring clips each fastened to a flange of the tire rim part and extending radially and axially inwardly to a free angular yieldable extremity providing a radially inwardly opening cover-engaging groove-like pocket, said angular extremities of the clips being disposed substantially in a common circle of a diameter less than that of said shoulder and positioned to be cammingly engaged by said cover shoulder as the cover is pressed axially into the wheel and to snap over and around said shoulder for floatingly supporting the cover on the wheel, said cover when on the wheel being completely spaced from the wheel throughout its entire area and being only in engagement with the wheel through said clips.

3. In a cover structure for a wheel including multi-flange tire rim and body parts, a circular cover for disposition on the outer side of the wheel having its outer peripheral margin provided with a concealed skirt having a radially outwardly facing annular shoulder behind the cover, and cover retaining spring clips each fastened to a flange of the tire rim part and extending radially and axially inwardly to a free angular yieldable extremity, said angular extremities of the clips being disposed substantially in a common circle of a diameter less than that of said shoulder and positioned to be cammingly engaged by said cover shoulder as the cover is pressed axially into the wheel and to snap over and around said shoulder for floatingly supporting the cover on the wheel, said skirt comprising a ring of concave convex cross-sectional shape with its radially inner edge formed into said shoulder and with its radially outer edge interlocked with the peripheral margin of the cover.

4. In a cover structure for a wheel including multi-flange tire rim and body parts, a circular cover disposed on the outer side of a wheel and completely spaced throughout its entire area from the parts thereof and cover retaining spring clips carried by a flange of said rim part and extending radially inwardly from the flange, each clip terminating behind the cover in a yieldable extremity, said cover having a radially outwardly projecting shoulder of a diameter such as to be yieldably gripped in said clip extremities whereby the cover is carried and retained in a floating condition on the wheel solely by said clips, said extremity of each clip comprising an angular portion with the vertex of the angle extending radially outwardly so as to define a radially inwardly opening pocket in which the shoulder of the cover is received for yieldably holding the cover against axial displacement.

5. In a wheel structure including a wheel body and a multi-flange tire rim including a generally axially extending intermediate flange and a generally radially outwardly extending outer side flange joining said intermediate flange, cover retaining clips having base portions secured to said radially extending outer side flange and including generally radially and axially inwardly extending resilient portions in radially inwardly spaced relation to said intermediate flange, the inner extremities of the clips comprising radially inwardly opening cover-engaging pockets, and a cover for substantially concealing the outer side of the wheel and said clips and having a generally radially outwardly projecting shoulder retainingly engaging in said clip pockets, the cover being supported entirely by the clips in substantially floating relation to the outer side of the wheel and in completely spaced relation to all parts of the wheel.

6. In a wheel structure including a wheel body and a multi-flange tire rim including a generally axially extending intermediate flange and a generally radially outwardly extending outer side flange joining said intermediate flange, cover retaining clips having base portions secured to said radially extending outer side flange and including generally radially and axially inwardly extending resilient portions in radially inwardly spaced relation to said intermediate flange, the inner extremities of the clips comprising radially inwardly opening cover-engaging pockets, and a cover for substantially concealing the outer side of the wheel and said clips and having a generally radially outwardly projecting shoulder retainingly engaging in said clip pockets, the cover being supported entirely by the clips in substantially floating relation to the outer side of the wheel and in completely spaced relation to all parts of the wheel, said cover shoulder being a turned bead on the inner extremity of a skirt behind the radially outer margin of the cover.

7. In a wheel structure including a wheel body and a multi-flange tire rim including a generally axially extending intermediate flange and a generally radially outwardly extending outer side flange joining said intermediate flange, cover retaining clips having base portions secured to said radially extending outer side flange and including generally radially and axially inwardly extending resilient portions in radially inwardly spaced relation to said intermediate flange, the inner extremities of the clips comprising radially inwardly opening cover-engaging pockets, and a cover for substantially concealing the outer side of the wheel and said clips and having a generally radially outwardly projecting shoulder retainingly engaging in said clip pockets, the cover being supported entirely by the clips in substantially floating relation to the outer side of the wheel and in completely spaced relation to all parts of the wheel, said clip pockets being of angular groove formation and the cover shoulder comprising an angular rib on an intermediate portion of the cover generally complementary in cross-section to the clip pockets.

GEORGE ALBERT LYON.

REFERENCES CITED

The following references are of record in the file of this patent:

UNITED STATES PATENTS

| Number | Name | Date |
| --- | --- | --- |
| 2,239,367 | Lyon | Apr. 22, 1941 |
| 2,265,241 | Lyon | Dec. 9, 1941 |
| 2,386,241 | Lyon | Oct. 9, 1945 |
| 2,410,174 | Lyon | Oct. 29, 1946 |